(12) United States Patent
Jeanneau et al.

(10) Patent No.: US 11,455,009 B2
(45) Date of Patent: Sep. 27, 2022

(54) PROTECTIVE CASE FOR A LAPTOP COMPUTER

(71) Applicant: MOBILIS DEVELOPMENT, Chavanod (FR)

(72) Inventors: Benoit Jeanneau, Annecy (FR); Marc Fernandez, Annecy (FR)

(73) Assignee: MOBLIS DEVELOPMENT, Chavanod (FR)

( * ) Notice: Subject to any disclaimer, the term of this patent is extended or adjusted under 35 U.S.C. 154(b) by 0 days.

(21) Appl. No.: 17/509,826

(22) Filed: Oct. 25, 2021

(65) Prior Publication Data

US 2022/0155820 A1    May 19, 2022

(30) Foreign Application Priority Data

Nov. 16, 2020   (FR) ........................................ 2011688

(51) Int. Cl.
   *G06F 1/16*   (2006.01)
(52) U.S. Cl.
   CPC .......... *G06F 1/1628* (2013.01); *G06F 1/1656* (2013.01); *G06F 2200/1633* (2013.01)
(58) Field of Classification Search
   CPC .... G06F 1/1628; G06F 1/1632; G06F 1/1656; G06F 1/166
   See application file for complete search history.

(56) References Cited

U.S. PATENT DOCUMENTS

| | | | | |
|---|---|---|---|---|
| 10,499,719 | B2 * | 12/2019 | Chan | H04B 1/3888 |
| D897,092 | S * | 9/2020 | Chan | D3/201 |
| 11,278,095 | B1 * | 3/2022 | Chan | A45C 11/00 |
| 11,366,919 | B2 * | 6/2022 | Botdorf | G06F 1/1656 |
| 11,388,970 | B2 * | 7/2022 | Gordon | G06F 1/1628 |
| 2005/0231930 | A1 | 10/2005 | Jao | |
| 2012/0037523 | A1 * | 2/2012 | Diebel | A45C 13/005 206/320 |
| 2013/0016467 | A1 | 1/2013 | Ku | |
| 2014/0192478 | A1 * | 7/2014 | Houvener | G06F 1/163 361/679.41 |
| 2019/0216196 | A1 * | 7/2019 | Chan | A45C 11/00 |
| 2022/0160088 | A1 * | 5/2022 | Malmloff | A45C 13/001 |

FOREIGN PATENT DOCUMENTS

GB          2489190 A      9/2012

OTHER PUBLICATIONS

Search Report issued in French Patent Application No. 2011688 dated Jun. 23, 2021.

* cited by examiner

*Primary Examiner* — Adrian S Wilson
(74) *Attorney, Agent, or Firm* — Marshall, Gerstein & Borun LLP

(57) ABSTRACT

A protective case for a laptop computer includes a first portion and a second portion, hinged to each other at the level of a junction area, and intended to protect the upper surface (screen) and the lower surface (base) of the laptop computer. One of the portions is provided with a receptacle capable of receiving the base of the computer. The receptacle is hinged at the level of the free edge of the portion, opposite to the edge of the portion taking part in the junction area between the two portions. The portion is formed of a frame defining a through opening or window, and of a foldable flap, capable of reversibly closing said opening or window.

9 Claims, 10 Drawing Sheets

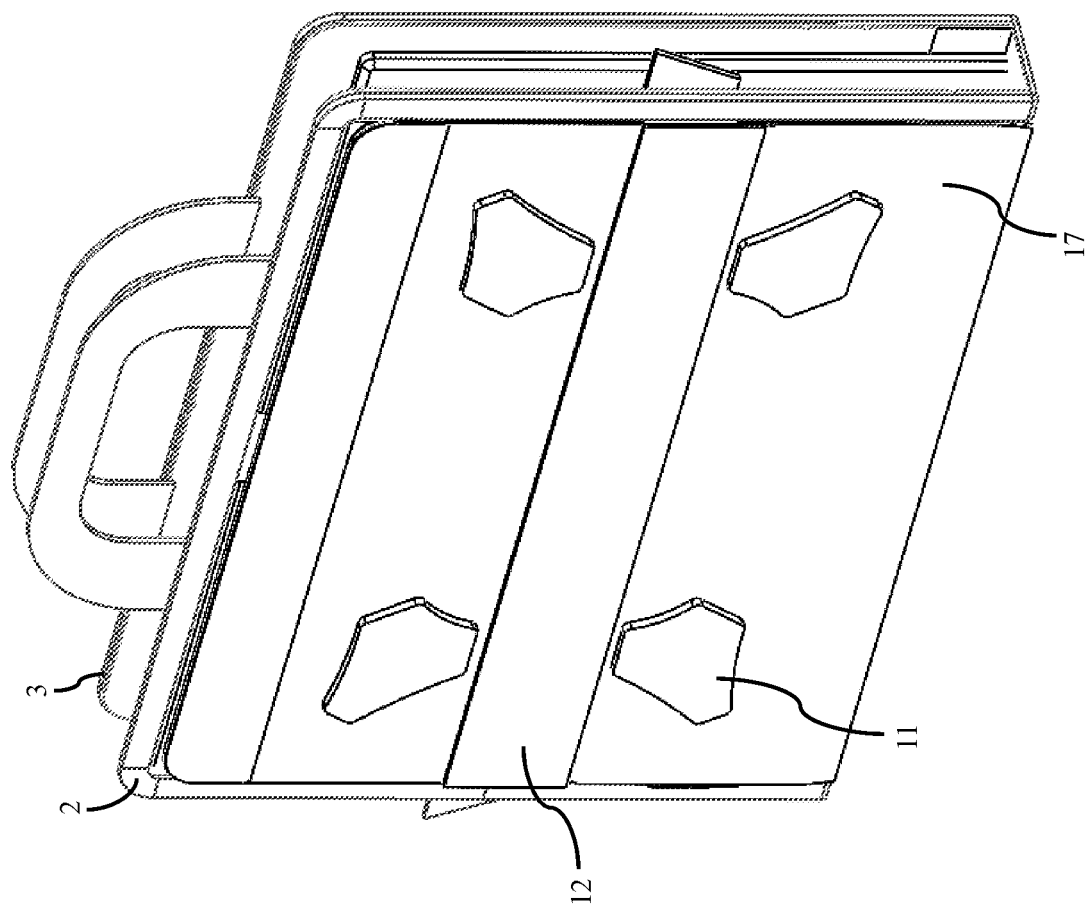

PROTECTIVE CASE FOR A LAPTOP COMPUTER

FIELD OF TECHNOLOGY

The disclosure concerns a protective case for a laptop computer, intended to protect said computer from shocks during its transport and its use. It more particularly aims at a protective case for a laptop computer of the type comprising a display screen likely to be hinged to the base of said computer with a 360° angular displacement, and where said screen is likely to be used as a touch pad.

BACKGROUND

Cases and other protective sleeves intended to ease the transportation and the protection of laptop computers are widely used and are almost as old as laptop computers themselves. They conventionally are in the form of a handbag of appropriate dimension into which said computer can be inserted.

They have been improved so as to keep said computer inside of the case during its use. In this case, they are formed of an upper portion and of a lower portion hinged together, said lower portion receiving the actual computer, possible attached to said lower portion by any appropriate means such as a strap or an elastic band. During transport phases, the upper portion of the case is closed on the lower portion and is attached thereto by means of a zip-type closing system. During phases of use, the upper portion is opened, allowing the opening of the screen of said computer and thus the use thereof.

If such cases fulfill their functions for conventional-type laptop computers, however, they appear unsuitable for computers of convertible PC-tablet type, that is, where the screen is likely to be opened at 360° with respect to its base, when said screen can be used as a touch pad. Indeed, in this configuration, the computer must be fully removed from the case to allow the effective rotation of the screen with respect to its base.

The aim targeted is to enable to ensure the protection of this type of convertible PC-tablet laptop computer, including when the computer is used in touch pad mode, and this, by means of a protective case, keeping its primary protection function, during the transport as well as during the use of said computer, and this, without requiring the removal of said computer from the case, particularly during the passage thereof from the PC mode to the tablet mode.

SUMMARY OF THE DISCLOSURE

For this purpose, disclosed embodiments target a protective case for a laptop computer, said case comprising a first portion and a second portion, hinged to each other at the level of a junction area, and intended to protect the upper surface (screen) and the lower surface (base) of said laptop computer.

According to disclosed embodiments:

one of the portions is provided with a receptacle capable of receiving the base of said computer, said receptacle being hinged at the level of the free edge of said portion, opposite to the edge thereof adjacent to the junction area between the two portions;

said portion is formed of a frame defining a through opening and of a flap foldable on said frame, capable of closing said opening.

In other words, disclosed embodiments comprise receiving the base of said laptop computer, not directly at the level of one of the portions of the case, in the case in point the lower portion, but in a receptacle or cradle, hinged on the considered portion, and thus enabling the base of the computer to be tilted with respect to the lower portion without being stowed out of it, and as a corollary to fold the screen at 360° to reach the tablet mode and this, without having the remove the computer from said case, the considered portion being formed so as to allow the access to the screen due to the presence of a foldable flap.

According to embodiments, the foldable flap is also hinged at the level of the junction area between the upper portion and the lower portion.

According to embodiments, this flap can be reversibly attached to the frame of the lower portion of the case by any means, and particularly by a hook-and-loop type system, better known under trademark Velcro®.

According to embodiments, the receptacle is provided with housings capable of receiving said computer and, more specifically, the base of said computer, and this, removably.

According to still another feature of embodiments, the receptacle extends over a portion only of one of the dimensions of the considered portion.

According to embodiments, the hinge between the receptacle and the concerned portion is formed by simple stitching.

Advantageously, the foldable flap is provided with dampers on one of its surfaces, and particularly on its surface intended to come into contact with the base of the computer when said flap closes the through window or opening defined by the frame of the lower portion, and this, to optimize the protection of the laptop computer, particularly during transport phases.

Advantageously, the foldable flap is provided with an elastic band, capable of favoring the gripping of the assembly formed by the case and the laptop computer, when the latter operates in touch pad mode.

BRIEF DESCRIPTION OF THE FIGURES

The way in which the disclosed embodiments may be implemented and the resulting advantages will better appear from the following non-limiting embodiments, in relation with the accompanying drawings.

FIG. 10 is a view similar to FIG. 9, seen on the other side of said case, in the same configuration.

DETAILED DESCRIPTION

Figure 1:
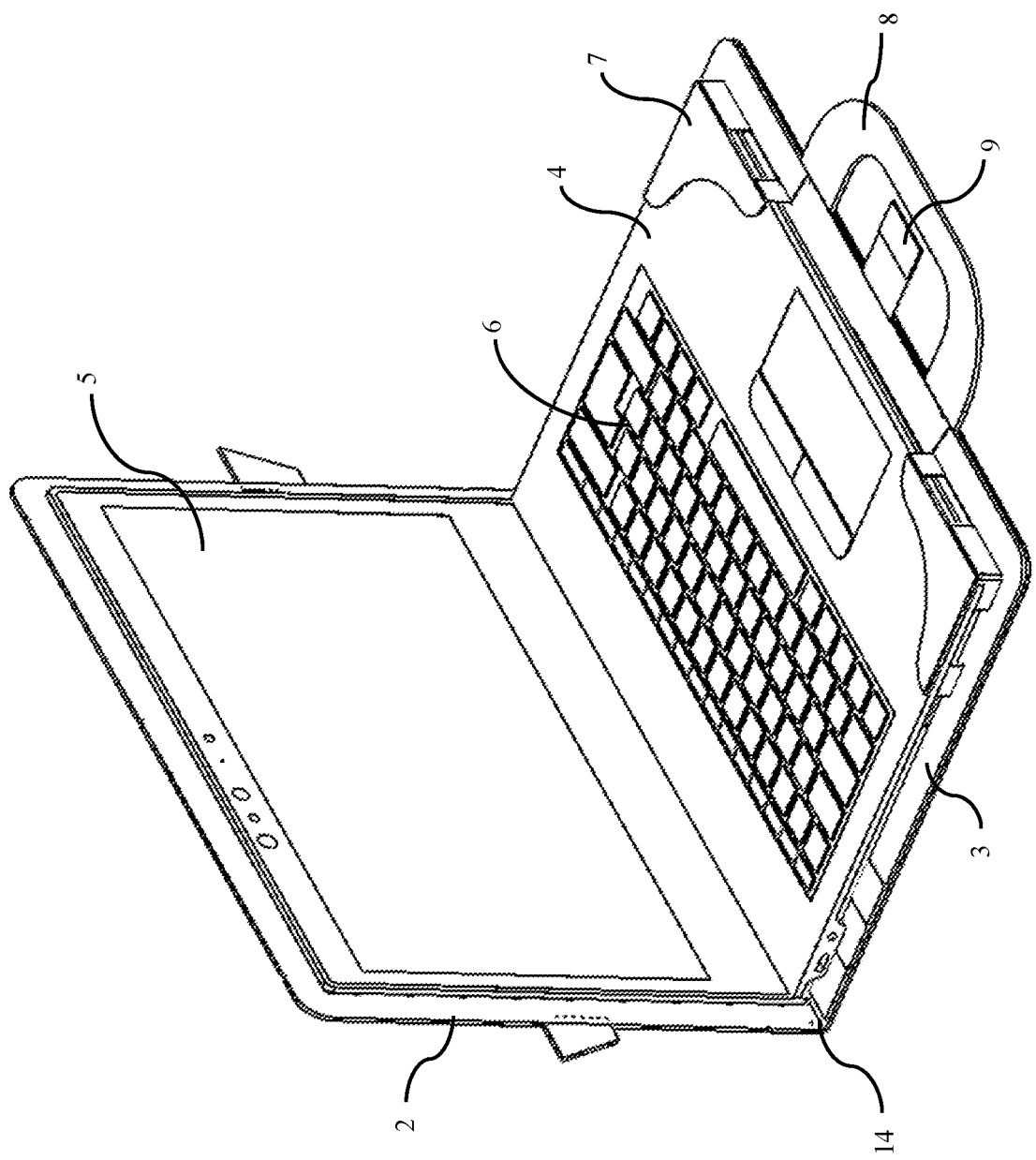
FIG. 1 is a simplified perspective view of a laptop computer opened within a protective case.

There has thus been shown, within FIG. 1, the protective case provided with a laptop computer in open position, that is, in a conventional position of use.

Typically, this case is formed of a lower portion (3) and of an upper portion (2) coupled together by a junction area (14). According to an embodiment, the entire case, that is, the lower portion (3), the upper portion (2), and the junction area, is formed of a continuous external structure, typically made of polyamide 6 (Nylon®) or of polyurethane, said lower (2) and upper (3) portions further receiving a stiffening plate, typically made of polycarbonate placed against the inner surface of the external continuous structure. However, the junction area (14) does not comprise such a plate, to allow the opening and the closing of the case thus formed, playing in a way the role of a hinge for one of the portions with respect to the other.

Further, the inner surface of the case receives a lining pasted on the stiffening plates.

Finally, the edge of the case is overstitched, to optimize the attaching together of these different elements, and to guarantee a durability of the case.

When the computer is closed, that is, when the computer screen (5) is folded on its base (4), provided with its keyboard (6), the upper portion (2) is also folded and the assembly can be closed, for example, by means of a tongue (9) provided with a reversible hook-and-loop attachment system, better known under trademark Velcro®, which positions on the outer surface of the upper portion (2) of the case.

As already mentioned hereabove, the respectively upper (2) and lower (3) portions are rigid. Of course, to ensure their protective function, they have dimensions slightly greater than the conventional dimensions of a laptop computer.

Figure 2:
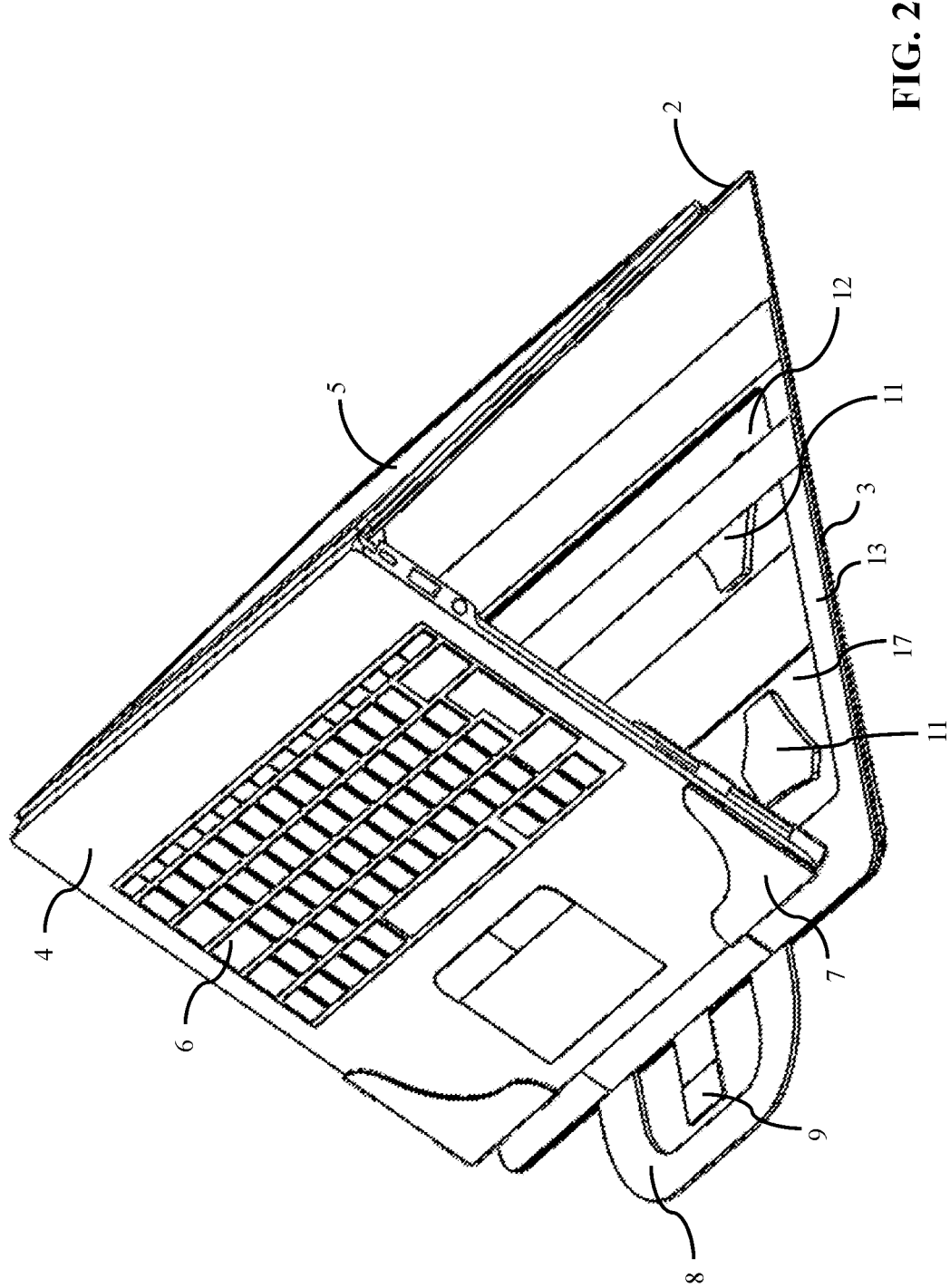
FIG. 2 is a simplified perspective view of the protective case provided with the laptop computer according to another configuration of use.

Another mode of use of a laptop computer in the case has been shown in FIG. 2. In the case in point, the computer screen is likely to be tilted by an angle greater than 180° with respect to the plane defined by the base (4) of said computer. In this configuration, the screen is folded above the upper portion (2), the latter blocking at the level of the hinge of the screen (5) with the base (4) of the computer. A mode of use of the computer in tent mode is thus available.

Figure 3:
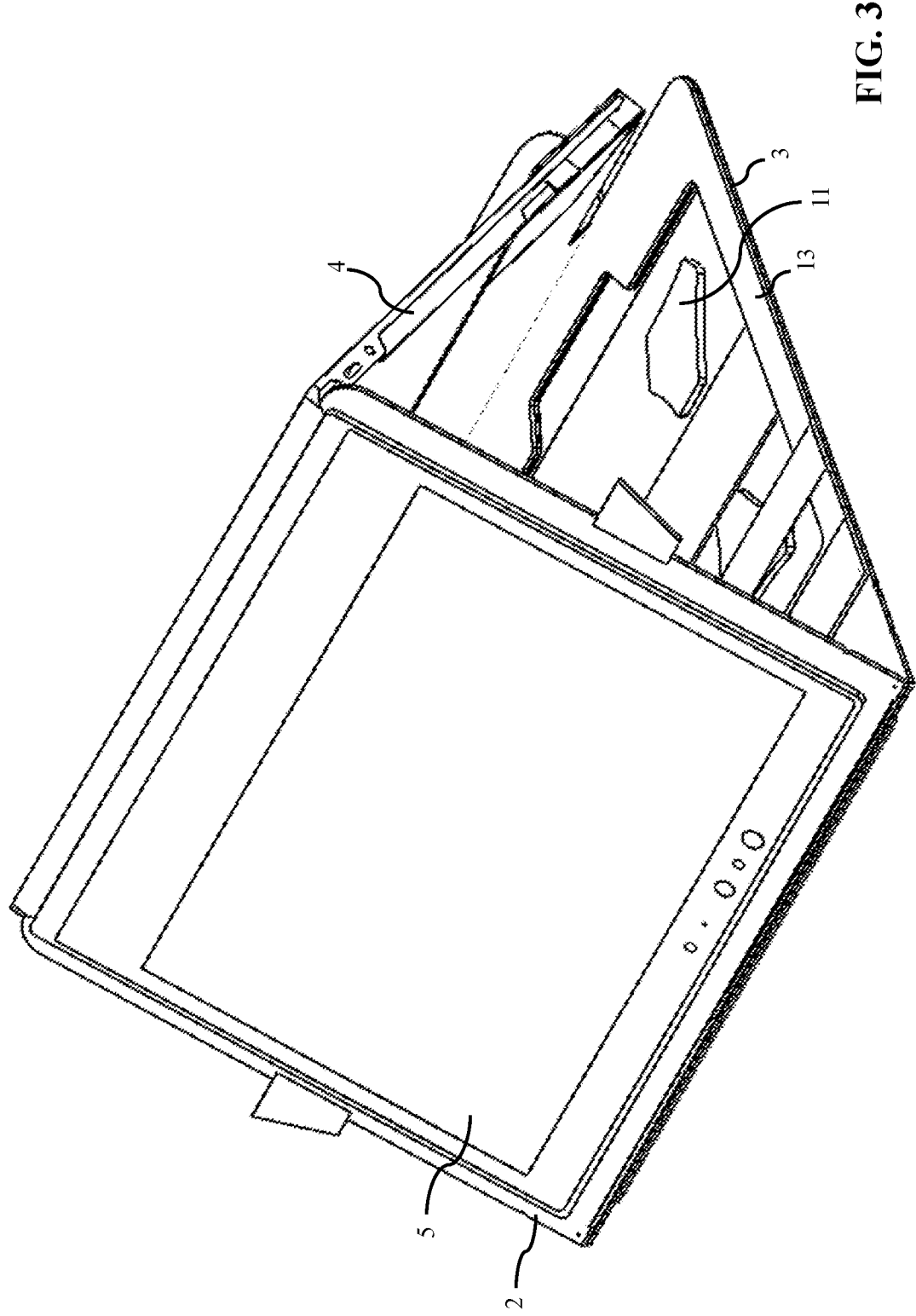
FIG. 3 is a view similar to FIG. 2 along another viewing angle.

FIG. 3 is a view similar to FIG. 2, seen along another direction, where the screen (5) of said computer likely to operate under this assumption in touch pad mode, in tent mode, is mainly observed.

Figure 4:
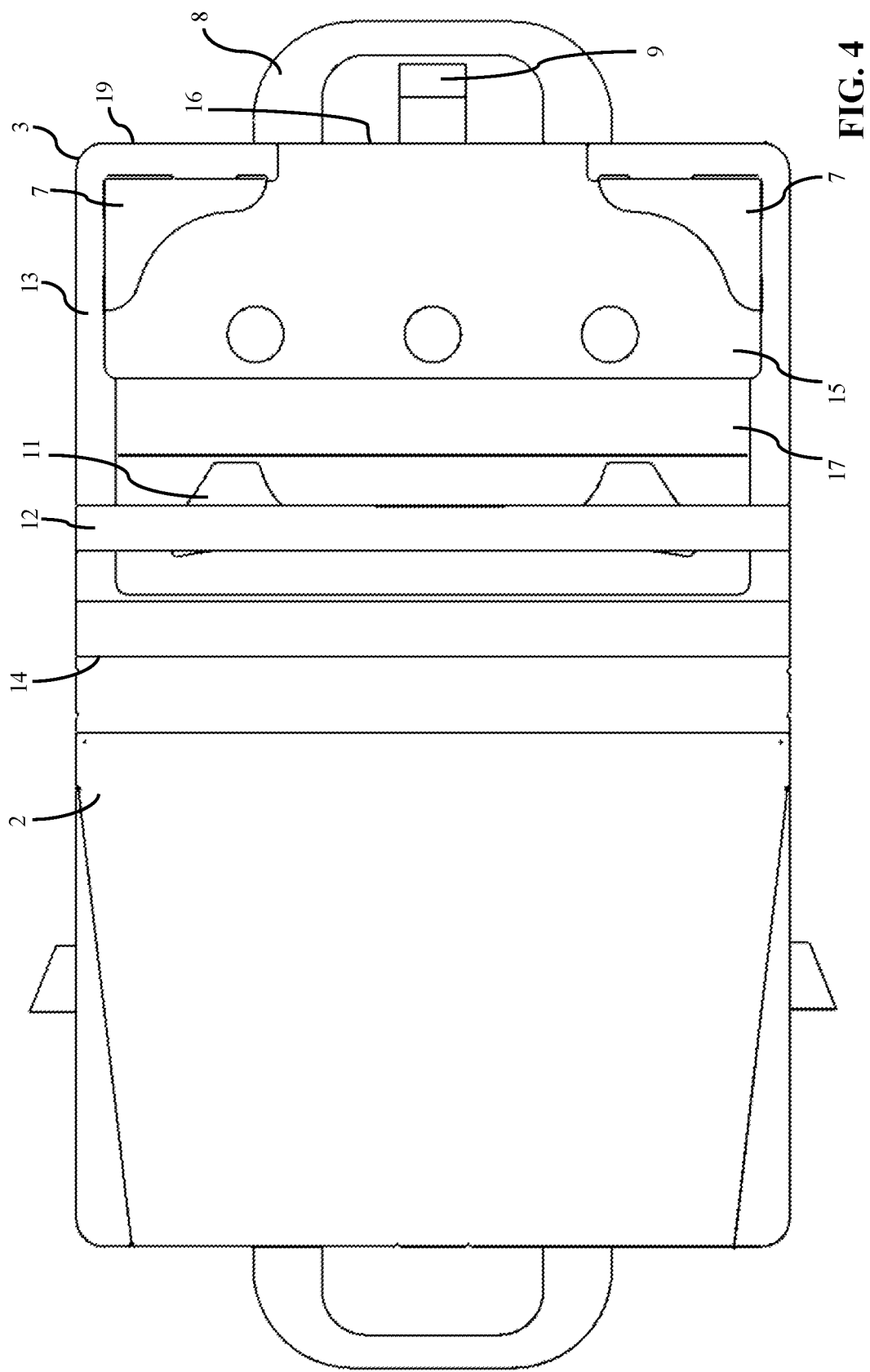
FIG. 4 is a simplified planar view of the protective case laid flat, that is, opened, in the absence of the laptop computer.
Figure 5:
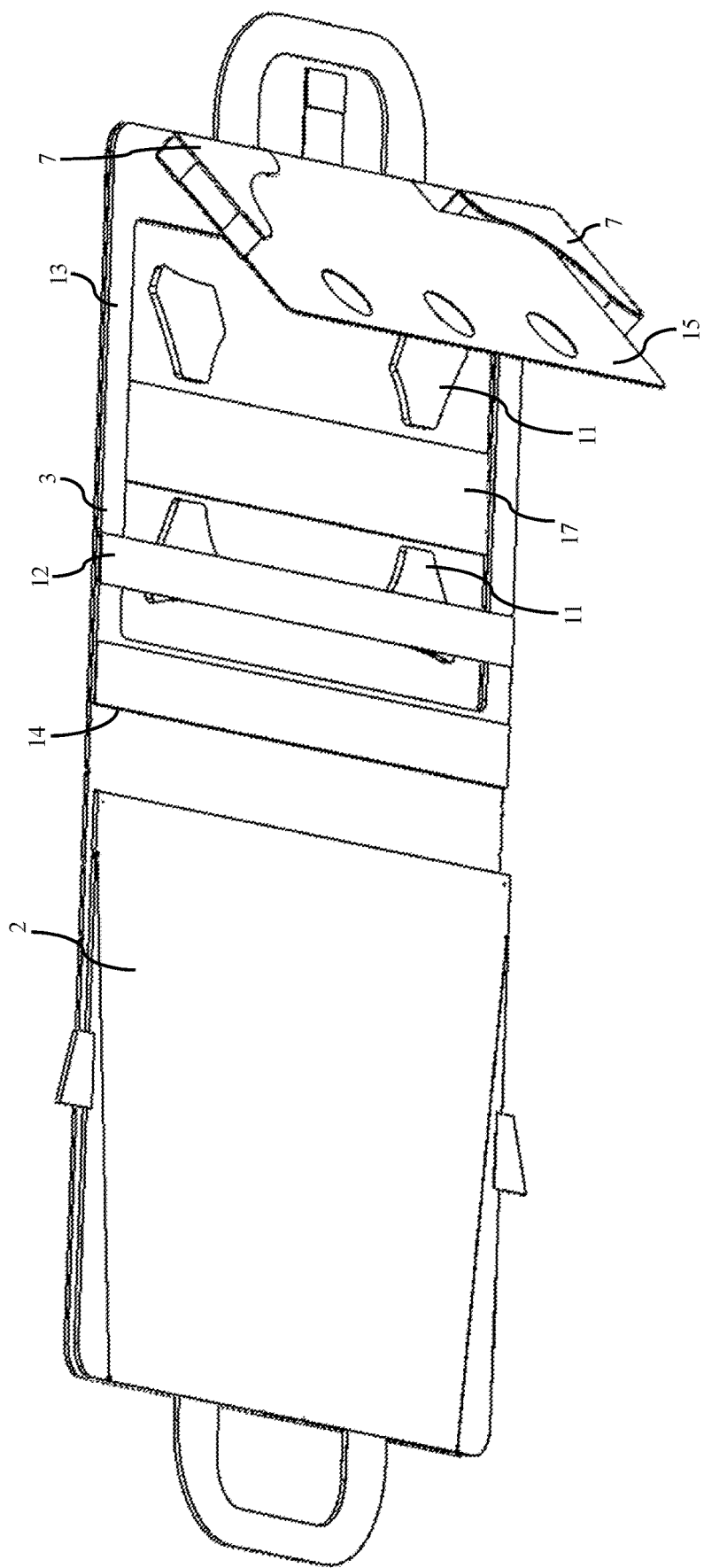
FIG. 5 is a simplified perspective view illustrating the protective case with the receptacle of the base of the laptop computer exhibiting a slight angular displacement.

The actual case has been shown in relation with FIG. 4, in planar view. This view particularly enables to better distinguish the features of the disclosed embodiments. One can in particular observe a receptacle (15), for example hinged by stitching (16) on the free edge (19) of the lower portion (3), said free edge in question being opposite to the edge of said lower portion (3) adjacent to the junction area (14) between the lower portion (3) and the upper portion (2). This receptacle is formed of a tongue, extending along a distance slightly shorter than the length of the edge (19), and is provided with actual areas (7) for receiving the base (4) of said laptop computer. This receptacle (15) that can be better observed in FIGS. 5 and 6 is configured so that the base (4) of said laptop computer can be effectively received in the areas (7), typically by simple insertion of said base, these areas (7) thus having dimensions adapted to the standard dimensions of said laptop computers, more particularly in terms of height of the housings that they define, compatible with the quasi-standard thickness of the base (4).

Thus, the base (4) of the computer is not directly received on the inner surface of the lower portion of the case (3), as for cases of the prior state of the art, but in this receptacle (7, 15), as already mentioned, hinged (16) on the free edge (19) of said lower portion (3). Thereby, the computer may itself tilt out of the protective case, while being still received therein.

According to another feature, the lower portion (3) of the case is in fact formed of a rectangular frame (13), extending all along the periphery of said lower portion (3). This frame defines a through opening or window (20), having dimensions substantially corresponding to the dimensions of the screen (5) of the laptop computer, the function of which will be described hereafter.

Figure 6:
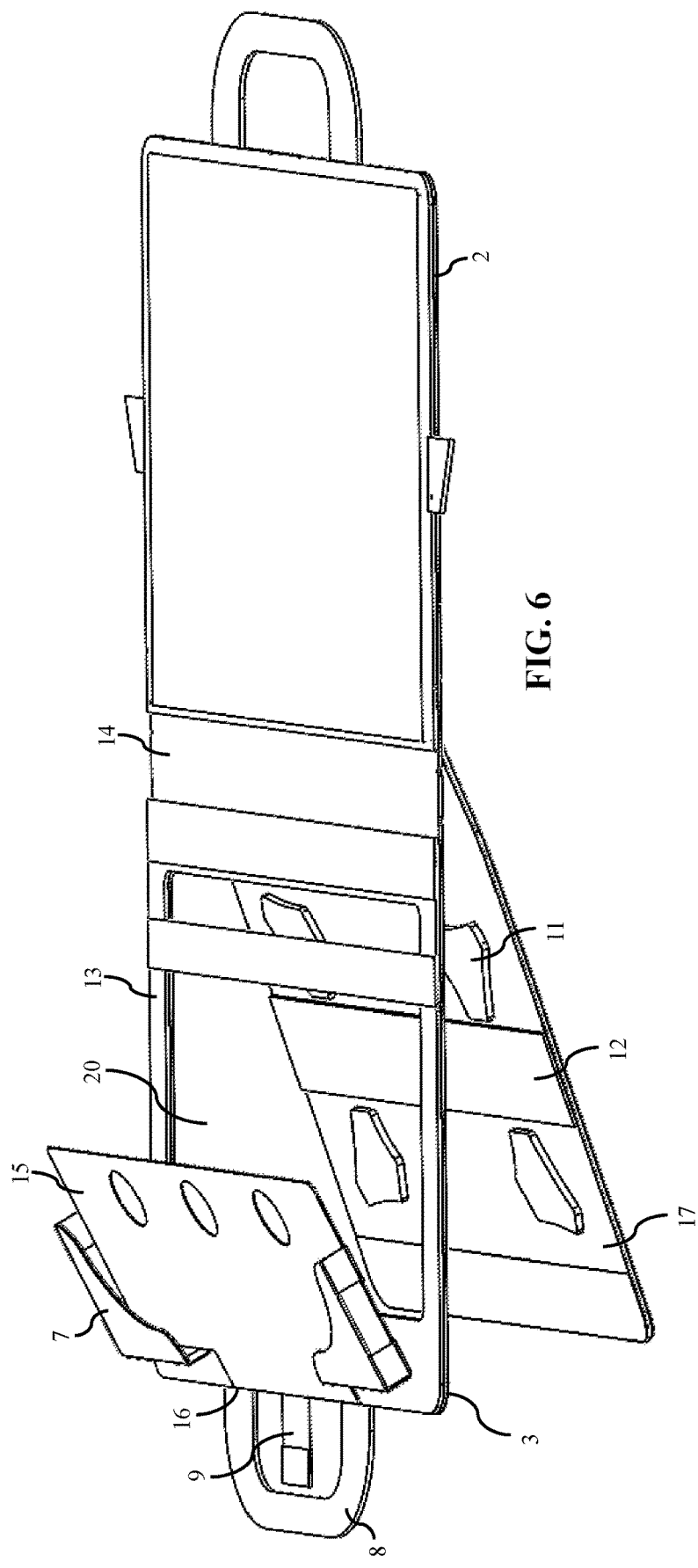
FIG. 6 is a view similar to FIG. 5, illustrating the foldable flap or bottom of the lower portion of the case, partially open.
Figure 8:
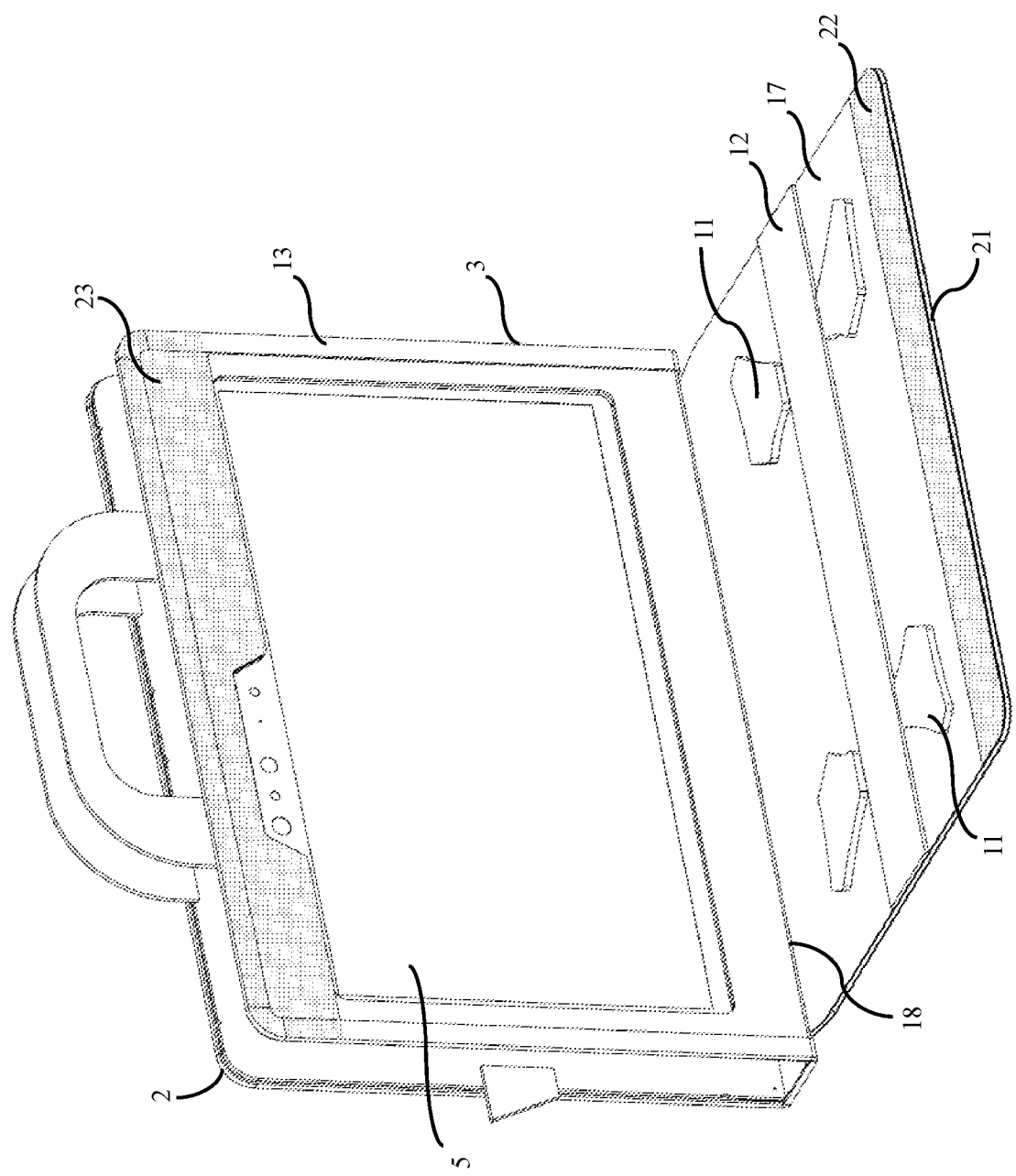
FIG. 8 is a simplified view of the protective case provided with the laptop computer in touch pad mode, with one of the elements of said case in deployed mode.
Figure 9:
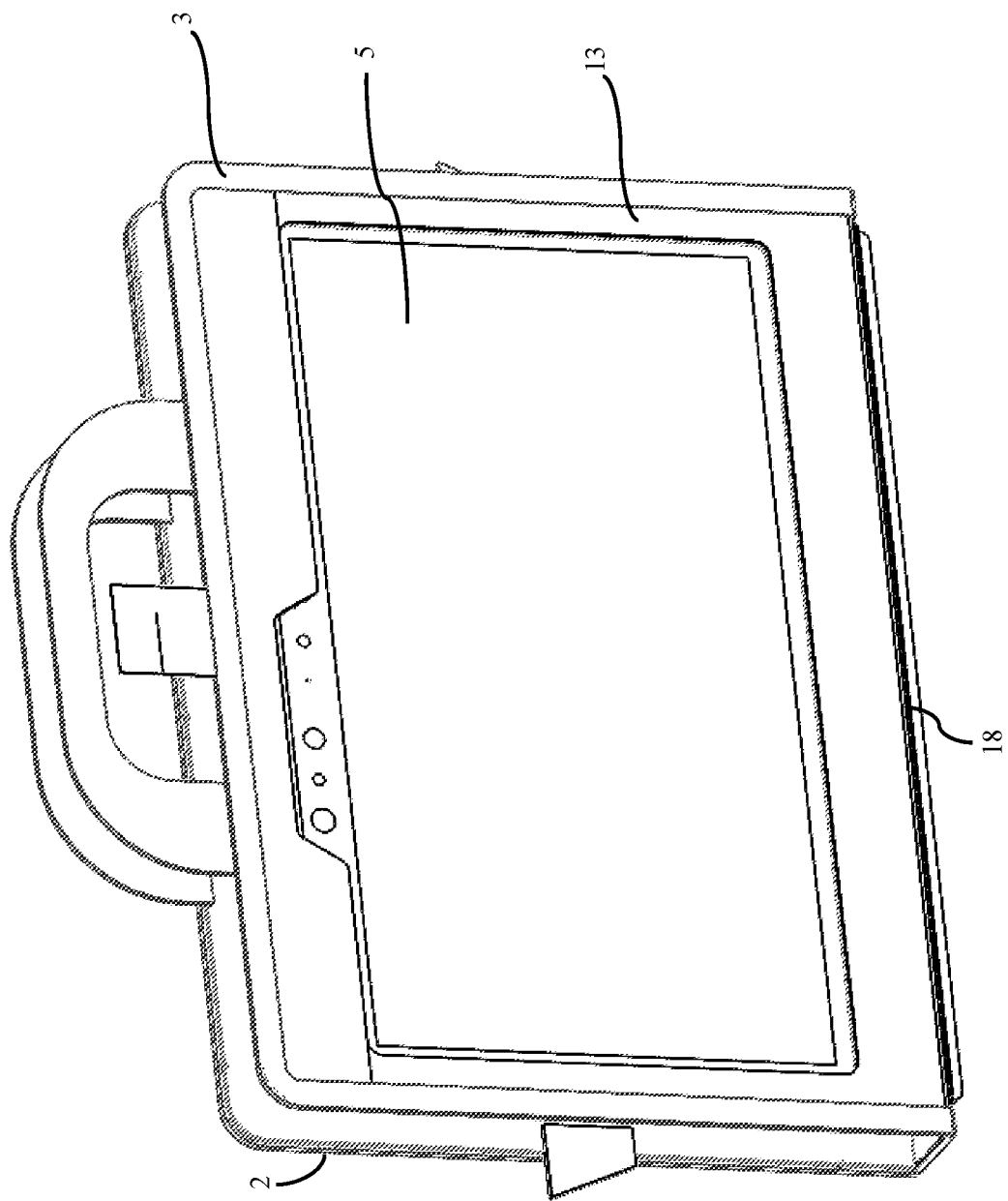
FIG. 9 is a view similar to FIG. 8 in operational mode, seen on the side of the case enabling to access the laptop computer screen.

In a conventional mode of use of the case provided with the laptop computer, that is, typically in transport mode or in an operating mode such as illustrated in FIG. 1, this through window (20) is closed by a bottom or flap (17), which can be better observed in FIGS. 6 and 8.

According to a first variant, this bottom or flap (17) is hinged at the level of the junction area (14) by simple stitching (18). It is likely to be folded against the outer surface of the frame (13) in "normal" mode of use of the case of the laptop computer. For this purpose, the bottom or flap (17) is provided, particularly in the vicinity of its free edge (21), with reversible attachment means (22) of hook-and-loop type (Velcro®), capable of cooperating with a complementary system (23) correctly positioned on the outer surface of the frame (13) (see FIG. 8).

Alternately, according to an embodiment, not shown, this bottom (17) may be fully detachable from the case. In this case, it is provided, at least at the level of its four angles, with reversible attachment systems, for example, of hook-and-loop type capable of cooperating with complementary systems appropriately positioned on the outer surface of the frame (13).

As a corollary, this bottom (17) may be provided with dampers (11) intended, particularly during transport phases, to optimize the protection provided by the case. This bottom (17) may also receive an elastic band (12), extending across the entire width of said bottom, and intended to favor the gripping by the user of the case provided with the laptop computer when said bottom is folded against the outer surface of the upper portion (2) during the use of the computer in tablet mode, and for example illustrated in FIG. 10: the user inserts his/her hand under this elastic band (12), thus avoiding risks of fall, particularly when the user is standing up.

Figure 7:
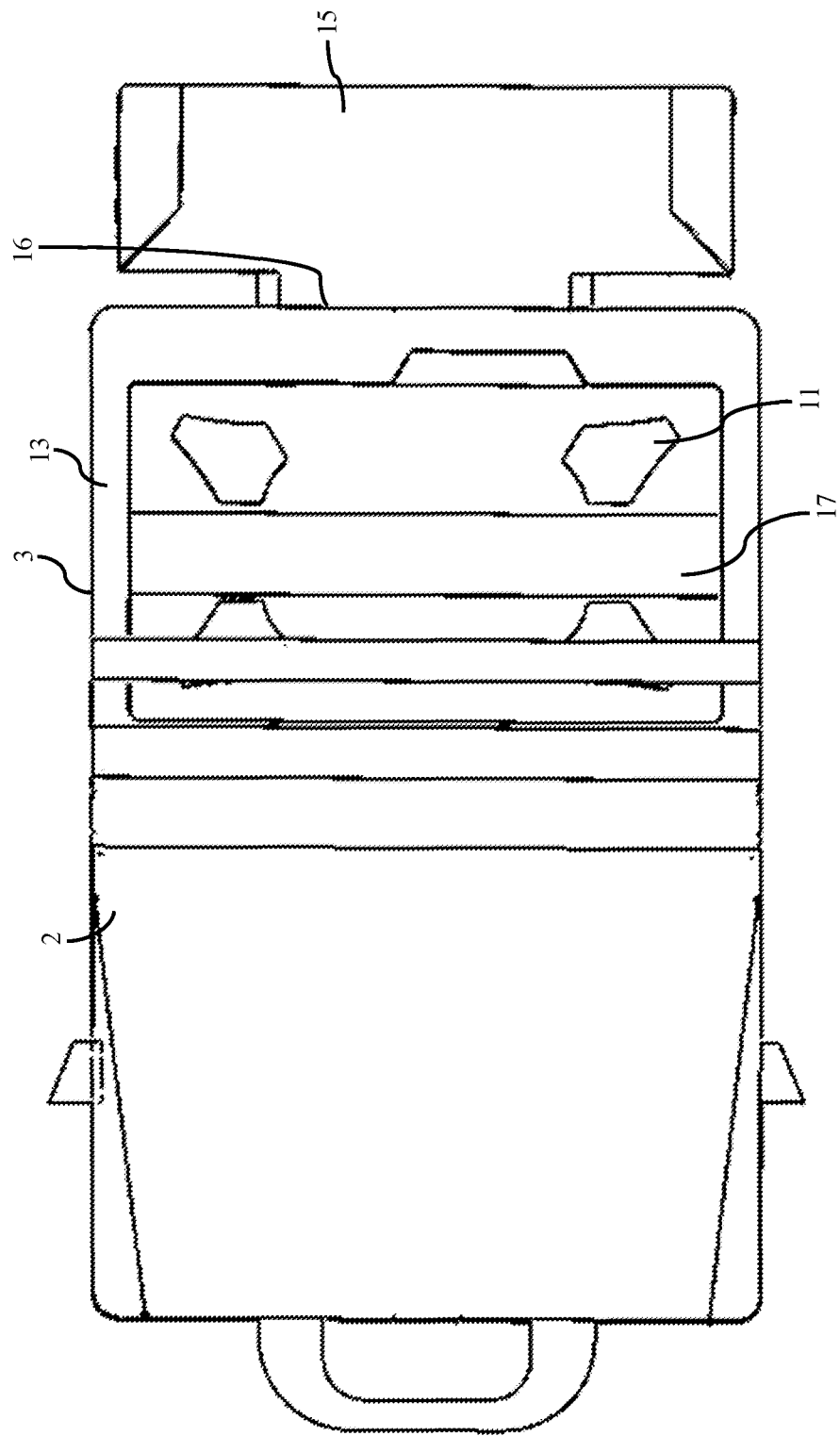
FIG. 7 is a simplified planar view of the protective case with the receptacle of the base fully deployed.

There has been shown, in relation with FIG. 7, a planar view of the case with the receptacle (15) fully deployed.

FIG. 8 illustrates a simplified perspective view of the laptop computer in the case, for a use in tablet mode. This FIG. 8 thus shows, no longer the keyboard but the screen (5) of said computer, directly accessible, while the case is in operational mode and protects said computer, in the case in point against shocks inherent to falls.

To reach this configuration, the base (4) of the computer, as already mentioned, is received in the receptacle (7, 15). Thereby, there is no separation of the laptop computer from the case. Due to the hinging of the receptacle (15) with respect to the lower portion (3) of the case, it becomes possible for the user to slightly tilt the base (4) towards the handle (8) and then to fully fold the screen (5) of said computer against the outer surface of the base (4), of course when the laptop computer in question is of convertible PC-tablet type, that is, where screen (5) is likely to be opened at 360° with respect to its base (4).

Once this operation has been performed, the visible and touch-sensitive area of the screen, after the folding of the receptacle (15) against the frame (13) of the lower portion (3), is in front of the through window (20) defined by said frame (13). The upper portion (2) may then be folded on the base (4) of the computer. To enable the user to access the screen (5), the bottom or flap (17) is stowed out of the frame (13), thus freeing the accessibility to the screen (5).

In a phase of use in this configuration, said bottom (17) is advantageously folded against the outer surface of the upper portion (2) of the case, as can be observed in FIG. 10. The bottom or flap (17) may advantageously be held against the outer surface of the upper portion (2) by means of the tongue (9).

Thereby, said touch screen (5) of the computer may be used by the user while the entire computer is protected by the case.

The advantage of the present embodiments, which enable to have a protection for a laptop computer, not only in transport mode, but also in a mode of use, and including in tablet mode, which was not possible with protection devices known to date, clearly appears.

The invention claimed is:

1. A protective case for a laptop computer, said computer comprising an upper surface provided with a screen and a lower surface or base, said case comprising a first portion and a second portion, hinged to each other at the level of a junction area, said case being intended to protect the upper surface or screen and the lower surface or base of said laptop computer, wherein one of said portions is provided with a receptacle configured to receive the base of said computer, said receptacle being hinged at the level of a free edge of said one portion, opposite to an edge of said one portion taking part in the junction area between the two portions; and wherein said one portion is formed of a frame defining a through opening or window, and of a foldable flap configured to reversibly close said opening or window.

2. The protective case for a laptop computer according to claim 1, wherein the foldable flap is hinged at the level of the junction area between the first portion and the second portion.

3. The protective case for a laptop computer according to claim 1, wherein the foldable flap is totally detachable from the case.

4. The protective case for a laptop computer according to claim 1, wherein at least part of the foldable flap is reversibly attached to the frame of the portion of the case by any means.

5. The protective case for a laptop computer according to claim 1, wherein the receptacle is provided with housings configured to removably receive the base of said computer.

6. The protective case for a laptop computer according to claim 1, wherein the receptacle extends over a portion only of one of the dimensions of the said one portion.

7. The protective case for a laptop computer according to claim 1, wherein the hinge between the receptacle and the said one portion results from a simple stitching.

8. The protective case for a laptop computer according to claim 1, wherein the foldable flap is provided with dampers on a surface intended to come into contact with the base of the laptop computer, when said flap closes the through window defined by the frame of the said one portion.

9. The protective case for a laptop computer according to claim 1, wherein the foldable flap is provided with an elastic band configured to favor a gripping of an assembly formed by the case and the laptop computer, when the latter operates in tablet mode.

* * * * *

UNITED STATES PATENT AND TRADEMARK OFFICE
CERTIFICATE OF CORRECTION

PATENT NO. : 11,455,009 B2
APPLICATION NO. : 17/509826
DATED : September 27, 2022
INVENTOR(S) : Benoit Jeanneau et al.

It is certified that error appears in the above-identified patent and that said Letters Patent is hereby corrected as shown below:

On the Title Page

At item (73), Line 1, "MOBLIS DEVELOPMENT," should be -- MOBILIS DEVELOPMENT, --.

Signed and Sealed this
Seventh Day of March, 2023

Katherine Kelly Vidal
*Director of the United States Patent and Trademark Office*